United States Patent
Vanderlinde

(10) Patent No.: US 11,708,938 B2
(45) Date of Patent: Jul. 25, 2023

(54) FOLDABLE BRACKET

(71) Applicant: GEM Products, Inc., Jacksonville, FL (US)

(72) Inventor: Nicholas Vanderlinde, Jacksonville, FL (US)

(73) Assignee: GEM Products, LLC, Jacksonville, FL (US)

( * ) Notice: Subject to any disclaimer, the term of this patent is extended or adjusted under 35 U.S.C. 154(b) by 106 days.

(21) Appl. No.: 17/481,270

(22) Filed: Sep. 21, 2021

(65) Prior Publication Data
US 2023/0090459 A1    Mar. 23, 2023

(51) Int. Cl.
F16M 13/02 (2006.01)
F16C 11/04 (2006.01)

(52) U.S. Cl.
CPC ........... *F16M 13/022* (2013.01); *F16C 11/04* (2013.01); *F16M 13/02* (2013.01)

(58) Field of Classification Search
CPC ....... F16M 13/02; F16M 13/022; F16C 11/04; F16C 11/10; A47B 96/028; A47B 57/045
See application file for complete search history.

(56) References Cited

U.S. PATENT DOCUMENTS

| | | | |
|---|---|---|---|
| 3,485,382 A * | 12/1969 | Larson | A47F 5/0815 248/220.42 |
| 4,437,414 A | 3/1984 | Brescia et al. | |
| 7,063,295 B2 * | 6/2006 | Kwon | G06F 1/1601 248/274.1 |
| 7,494,099 B2 * | 2/2009 | Shin | F16M 11/10 248/284.1 |
| 8,262,044 B2 * | 9/2012 | Luijben | F16M 11/10 248/920 |
| 8,746,642 B2 * | 6/2014 | Molter | F16M 13/02 248/299.1 |

(Continued)

FOREIGN PATENT DOCUMENTS

| | | |
|---|---|---|
| KR | 200311561 Y | 5/2003 |
| KR | 101715473 B1 | 3/2017 |
| KR | 20200002000 U | 9/2020 |

OTHER PUBLICATIONS https://www.rockler.com/folding-shelf-brackets-select-option?country=US&sid=V91040&promo=shopping&utm_source=google&utm_medium=cpc&utm_term=&utm_content=&utm_campaign=PL&gclid=PL&gclid=EAIalQobChMI9IG_koyn8gIV6XNvBB0E1gAREAQYASABEgJ9G_D_BwE, retrieved Aug. 10, 2021.

(Continued)

*Primary Examiner* — Eret C McNichols
(74) *Attorney, Agent, or Firm* — Seyfarth Shaw LLP

(57) ABSTRACT

A foldable bracket moveable between opened and folded positions. The foldable bracket including first and second bracket arms rotatably coupled to each other, where the second bracket arm includes a second bracket arm slot, a bracket arm linking member rotatably coupled to the first bracket arm and slidably coupled to the second bracket arm, first and second pins slidably disposed in the second bracket arm slot, where the second pin slidably couples the bracket arm linking member to the second bracket arm, a pin connecting member having an aperture and a pin connecting member slot, where the second pin is disposed in the aperture and the first pin is slidably disposed in the pin connecting member slot, and a release lever rotatably coupled to the second bracket arm and adapted to rotate between first and second positions.

15 Claims, 6 Drawing Sheets

(56) References Cited

U.S. PATENT DOCUMENTS

| | | | |
|---|---|---|---|
| 8,875,347 B2 | 11/2014 | Dwello et al. | |
| 10,024,490 B2* | 7/2018 | Lam | F16M 13/02 |
| 10,477,960 B1* | 11/2019 | Johnson | A47B 5/02 |
| 10,533,702 B2* | 1/2020 | Kahn | A47B 97/001 |
| 10,988,985 B2* | 4/2021 | Yoo | E06C 7/081 |
| 2002/0033436 A1* | 3/2002 | Peng | F16M 13/02 |
| | | | 248/284.1 |
| 2006/0291152 A1* | 12/2006 | Bremmon | F16M 11/10 |
| | | | 361/679.06 |
| 2007/0023599 A1* | 2/2007 | Fedewa | F16M 13/02 |
| | | | 248/289.11 |
| 2010/0207006 A1* | 8/2010 | Kim | F16M 11/10 |
| | | | 248/284.1 |
| 2010/0219315 A1* | 9/2010 | Muday | F16M 11/10 |
| | | | 248/295.11 |
| 2013/0146727 A1* | 6/2013 | Oh | F16M 13/02 |
| | | | 248/277.1 |
| 2013/0206943 A1* | 8/2013 | Molter | F16M 13/02 |
| | | | 248/299.1 |
| 2022/0097614 A1* | 3/2022 | Henry, Jr. | A47B 96/028 |

OTHER PUBLICATIONS https://www.sugatsune.com/product/stainless-steel-folding-bracket-2/, retrieved Sep. 10, 2021.

* cited by examiner

FOLDABLE BRACKET

TECHNICAL FIELD OF THE INVENTION

The present invention relates generally to brackets. More specifically, the present invention relates to foldable brackets.

BACKGROUND OF THE INVENTION

Foldable brackets are typically used to mount tables, shelves, seats, desks, etc. to walls or other suitable structures of buildings, motor vehicles, recreation vehicles, and boats. Foldable brackets typically have pivotal support members that provide structural support and stability in an opened position, and compact containment in a folded or closed position. Accordingly, foldable brackets are ideal for installation in multi-use areas with limited space, such as, for example, in small rooms, recreation vehicles, boats, etc.

Conventional foldable brackets require a user to manually actuate a release lever or other suitable release mechanism (e.g., push button) to allow the bracket to be moved from an opened position to a folded position. This requires the user to use both hands to change the configuration of the bracket. Moreover, due to the installation location of the bracket, reaching the release lever may require that the user maneuver themselves to an awkward or even dangerous position. Additionally, moving the bracket to the folded position is impossible if both hands of the user are not available, such as, for example, when the user is carrying items or a disabled user that does not have the use of both hands.

SUMMARY OF THE INVENTION

The present invention relates broadly to a foldable bracket that is able to self-lock in an opened position and self-unlock to be moved to a folded position. The present invention operates by first opening the bracket to a desired angle. In this position, a second pin slides in a slot past a release lever while a first pin limits the second pin from further travel in the slot. A lever is then rotated by a biasing member to prevent the bracket from being rotated back to the folded position. To allow the bracket to be moved to the folded position, there are two stages. The first stage is further opening the bracket such that the second pin can no longer slide in the slot and the first pin slides under the lever to overcome the bias force of the biasing member. In the second stage, the bracket is moved to the folded position by sliding the second pin under the lever as the first pin, which was preventing the lever from rotating, gets pushed along the slot, thereby allowing the bracket to close. Unlike conventional foldable brackets, the present invention allows for single-handed operation to move the bracket to either of its opened and folded positions.

In an embodiment, the present invention broadly comprises a foldable bracket moveable between opened and folded positions. The bracket includes first and second bracket arms rotatably coupled to each other, where the second bracket arm includes a second bracket arm slot, a bracket arm linking member rotatably coupled to the first bracket arm and slidably coupled to the second bracket arm, first and second pins slidably disposed in the second bracket arm slot, where the second pin slidably couples the bracket arm linking member to the second bracket arm, a pin connecting member having an aperture and a pin connecting member slot, where the second pin is disposed in the aperture and the first pin is slidably disposed in the pin connecting member slot, and a release lever rotatably coupled to the second bracket arm and adapted to rotate between first and second positions. When the release lever is disposed in the second position and the first and second bracket arms are rotated to a desired angle, the release lever and the second pin are adapted to cooperatively retain the foldable bracket in the opened position, and when the release lever is disposed in the first position, the foldable bracket is adapted to be moved to the folded position.

In another embodiment, the present invention broadly comprises a foldable bracket moveable between opened and folded positions. The bracket includes first and second bracket arms rotatably coupled to each other, wherein the second bracket arm includes a second bracket arm slot, two bracket arm linking members rotatably coupled to the first bracket arm and slidably coupled to the second bracket arm, first and second pins slidably disposed in the second bracket arm slot, wherein the second pin slidably couples the two bracket arm linking members to the second bracket arm, two pin connecting members, each having an aperture and a pin connecting member slot, where the second pin is disposed in the apertures of the two pin connecting members and the first pin is slidably disposed in the pin connecting member slots of the two pin connecting members, a release lever rotatably coupled to the second bracket arm and adapted to rotate between first and second positions, where when the release lever is disposed in the second position and the first and second bracket arms are rotated to a desired angle, the release lever and the second pin are adapted to cooperatively retain the foldable bracket in the opened position, and when the first and second bracket arms are rotated past the desired angle, the release lever is disposed in the first position to allow the foldable bracket to be moved to the folded position, and a biasing member adapted to apply a biasing force to the release lever to bias the release lever to the second position. When the foldable bracket is movable to the folded position, the first pin engages the release lever to overcome the bias force and rotate the release lever to the first position.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
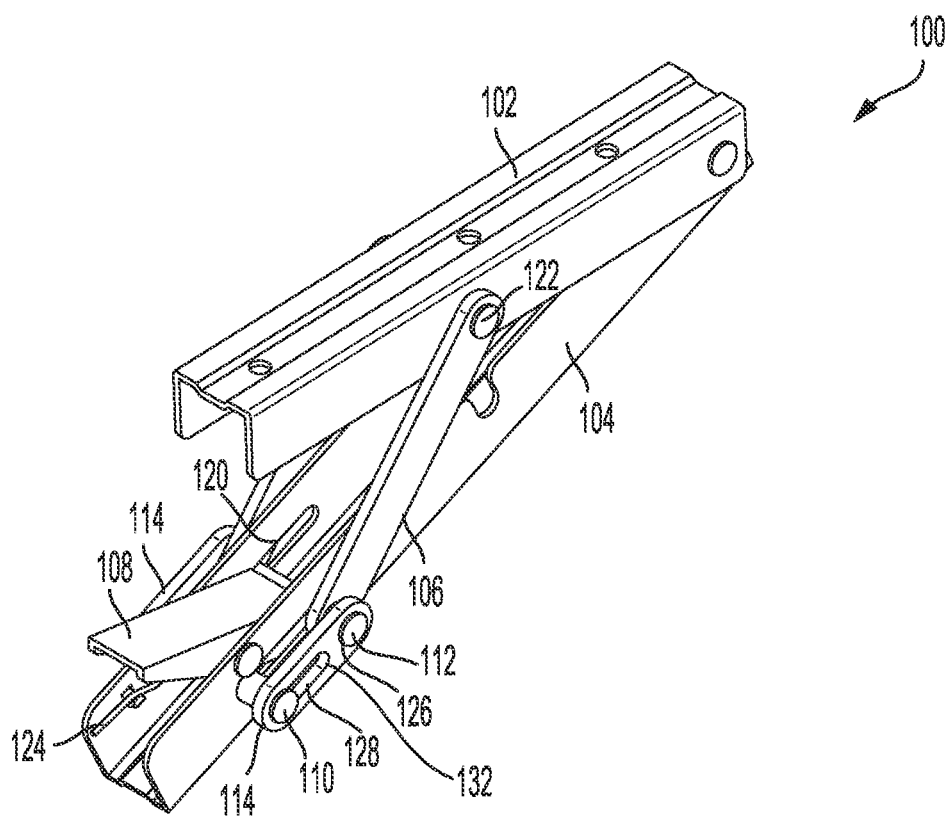
FIG. 1 is a perspective view of an exemplary foldable bracket disposed in an opened position, according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to a foldable bracket that is able to self-lock in an opened position and self-unlock to be movable to a folded position. The present invention operates by first opening the bracket to a desired angle. In this position, a second pin slides in a slot past a release lever while a first pin limits the second pin from further travel in the slot. The lever is rotated by a biasing member to prevent the bracket from being rotated back to the folded position. To allow the bracket to be movable to the folded position, there are two stages. The first stage is opening the bracket such that the second pin can no longer slide in the slot and the first pin slides underneath the lever to overcome the bias force of the biasing member. In the second stage, the bracket is moved to the folded position by sliding the second pin underneath the lever as the first pin, which was preventing the lever from rotating, gets pushed along the slot, thereby allowing the bracket to fully close. Unlike conventional foldable brackets, the present invention allows for single handed operation to put the bracket in either of opened and folded positions.

Referring to FIGS. 1-8, an exemplar foldable bracket 100 includes first 102 and second 104 arms rotatably coupled to one another via a fastener, such as for example, a pin, rivet, bolt, etc., and rotatable between opened and folded positions, a bracket arm linking member 106 rotatably coupled to the first bracket arm 102 and slidably coupled to the second bracket arm 104, a release lever 108 rotatably coupled to the second bracket arm 104, first 110 and second 112 pins slidably disposed in the second bracket arm 104, and a pin connecting member 114 receiving the first 110 and second pins 112.

Figure 6:
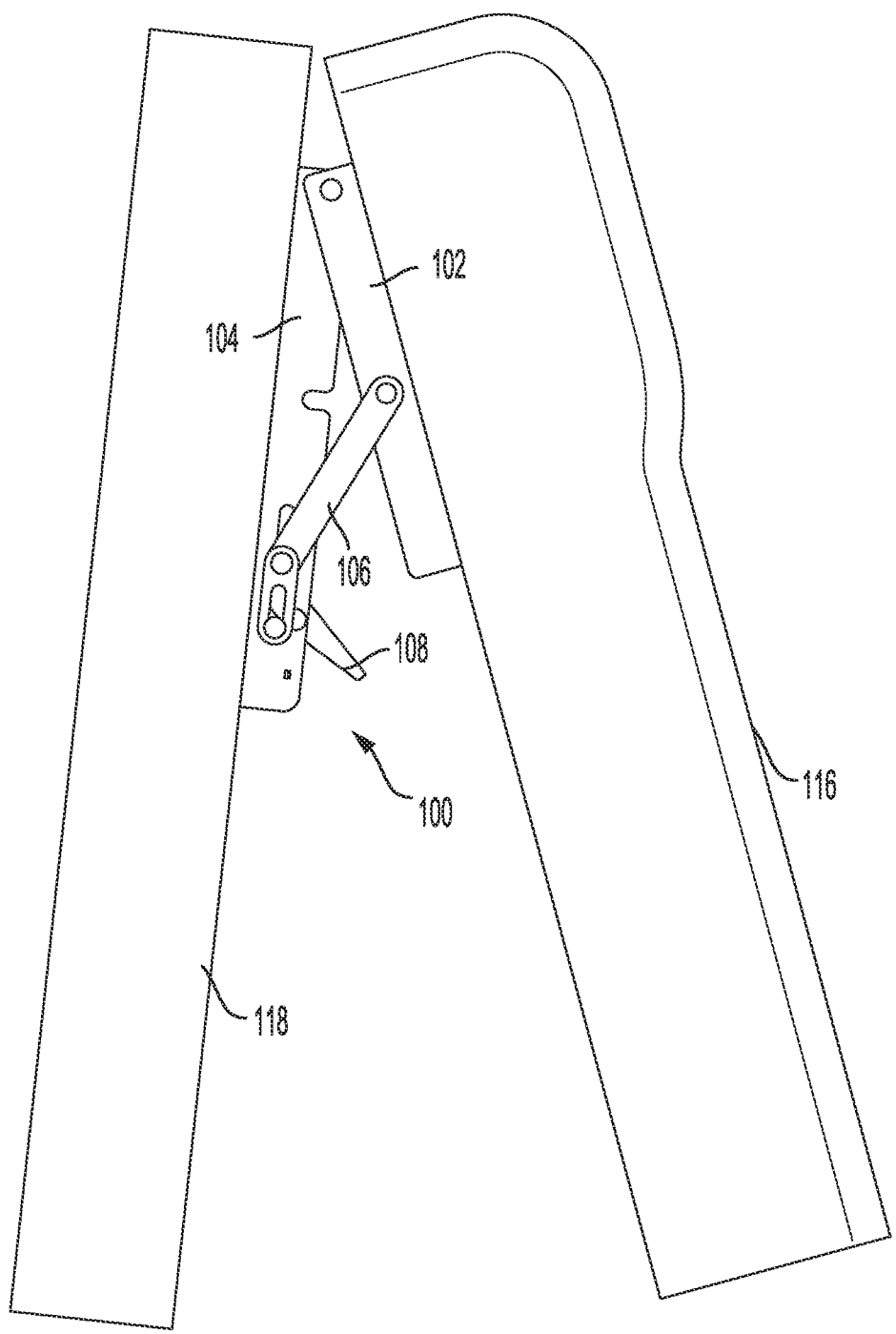
FIG. 6 is a side view of the foldable bracket of FIG. 1 coupled to an exemplary seat back.

The first bracket arm 102 is adapted to couple to and/or support an object, such as, for example, a table, shelf, seat, etc., to provide support thereto, and the second bracket arm 104 is adapted to couple to a wall or other suitable structure of a building, motor vehicle, recreation vehicle, or boat using known fastening techniques, such as, for example, fasteners, adhesives, etc. In a preferred embodiment, as illustrated in FIG. 6, the first bracket arm 102 is adapted to couple with a seat back 116 and the second bracket arm 104 is adapted to couple to a wall 118. In an embodiment, the first 102 and second 104 bracket arms are made from c-channel bar stock. The second bracket arm 104 includes a second bracket arm slot 120 adapted to slidably receive the first 110 and second 112 pins.

Figure 7:
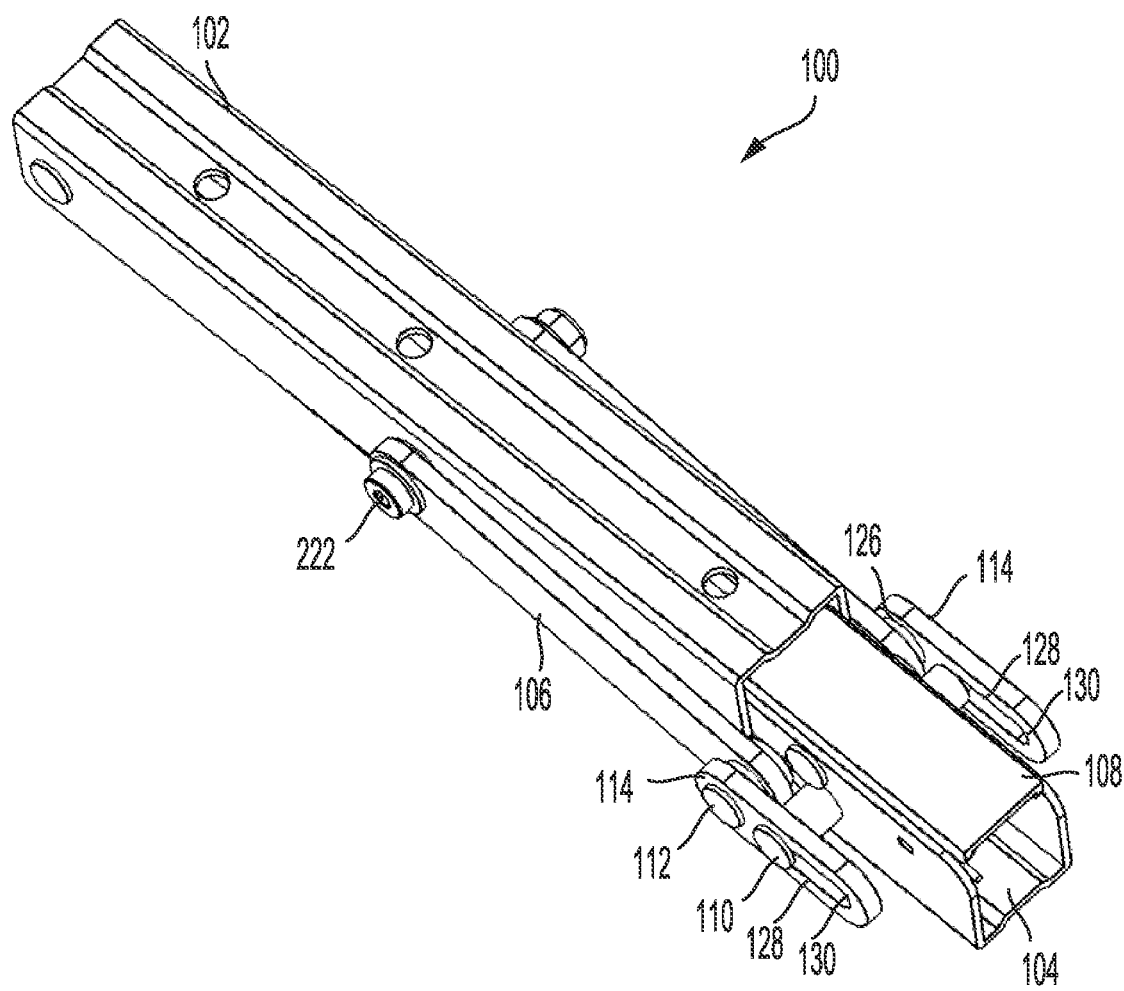
FIG. 7 is a perspective view of another exemplary foldable bracket in a folded position, according to another embodiment of the present invention.

The bracket arm linking member 106 is rotatably coupled to the first bracket arm 102 via a fastener, such as, for example, a rivet 122, and slidably coupled the second bracket arm 104 via the second pin 112. The bracket arm linking member 106 provides structural support and stability to the first bracket arm 102 when the foldable bracket 100 is disposed in the opened position. In an embodiment, the bracket arm linking member 106 includes two bracket arm linking members. In another embodiment, such as illustrated in FIG. 7, the bracket arm linking member 106 is rotatably coupled to the first bracket arm 102 via a threaded fastener 222, such as, for example a bolt and nut, to facilitate installation of the bracket arm linking member 106 to the first bracket arm 102.

The release lever 108 is rotatably coupled to the second bracket arm 104 using, for example, a threaded fastener, rivet, pin, etc., and is rotatable between first and second positions. A biasing member 124, such as, for example, a spring, applies a biasing force to the release lever 108 to bias the release lever 108 to the second position.

The pin connecting member 114 includes an aperture 126 adapted to receive the second pin 112 and a pin connecting member slot 128 adapted to receive the first pin 110. The slot 128 includes opposing first 130 and second 132 slot ends. In an embodiment, the pin connecting member 114 includes two pin connecting members. Although the first 110 and second 112 pins are illustrated as pins, the invention is not limited as such and any suitable fastener can be used, such as, for example, threaded fasteners, rivets, etc.

Figure 2:
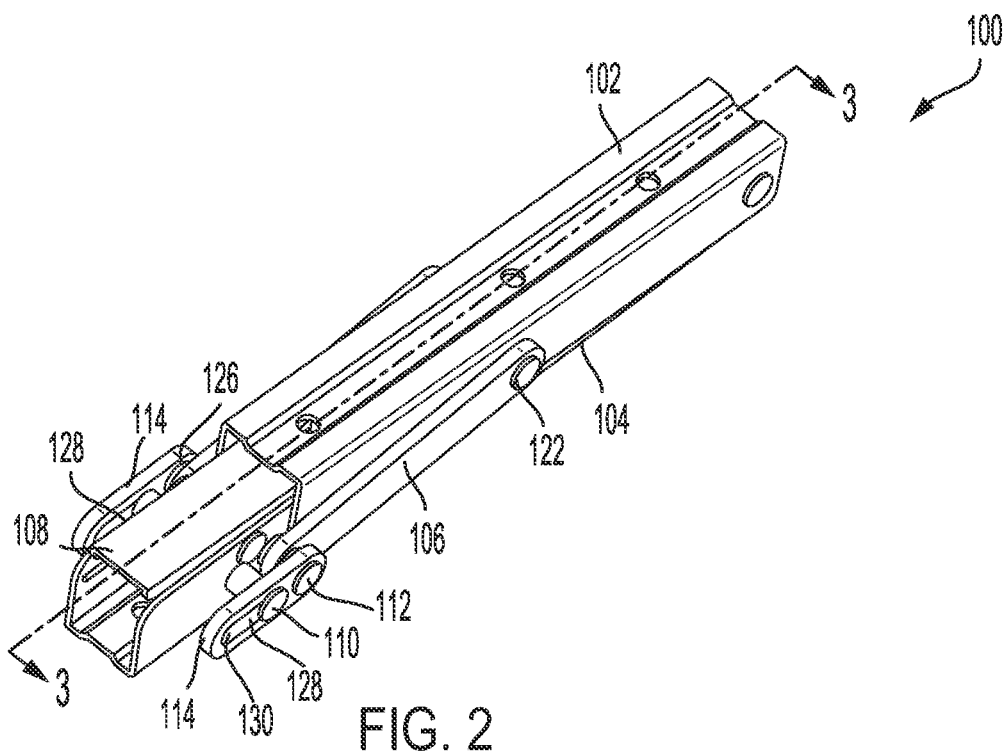
FIG. 2 is a perspective view of the foldable bracket of FIG. 1, disposed in a folded position.
Figure 3:
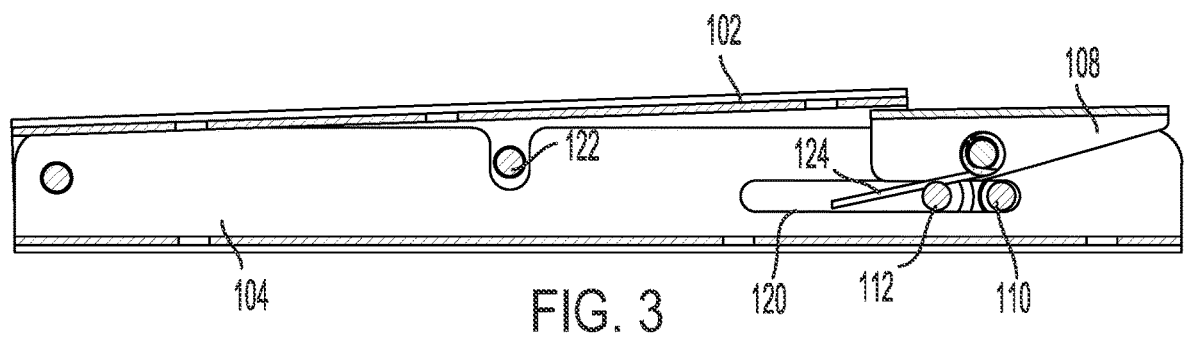
FIG. 3 is a section view of the foldable bracket of FIG. 2, taken along line 3-3.

In operation, to allow the foldable bracket 100 to be moved from a folded position, as illustrated in FIG. 2, to an opened position, as illustrated in FIG. 1, the first 102 and second 104 bracket arms are rotated away from each other. As the first 102 and second 104 bracket arms are rotated away from each other, the second pin 112 slides along the second bracket arm slot 120, which causes the pin connecting member 114 to move relative to the first pin 110. Once the first pin 110 reaches the first slot end 130 of the pin connecting member slot 128 and the second pin 112 passes the release lever 108, the bias force of the biasing member 124 rotates the release lever 108 from the first position to the second position, as illustrated in FIG. 1, whereby the release lever 108 and the second pin 112 cooperatively retain the foldable bracket 100 in the opened position at a desired angle.

Figure 4:
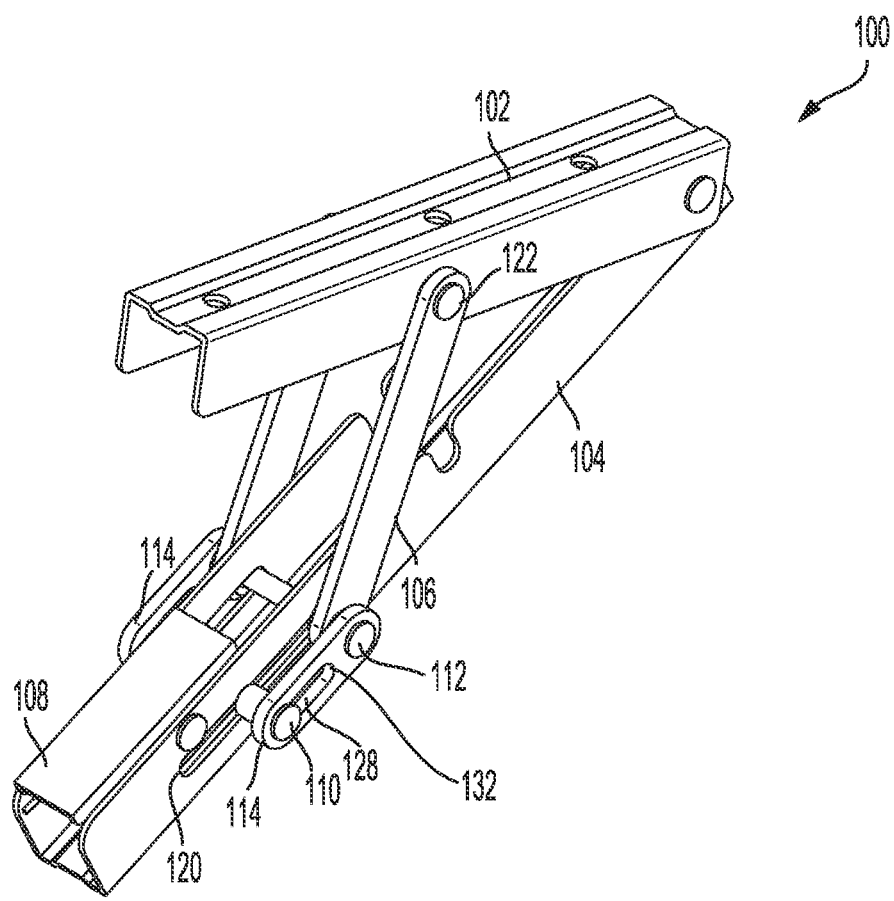
FIG. 4 is a perspective view of the foldable bracket of FIG. 1, disposed at an angle past the opened position.
Figure 5:
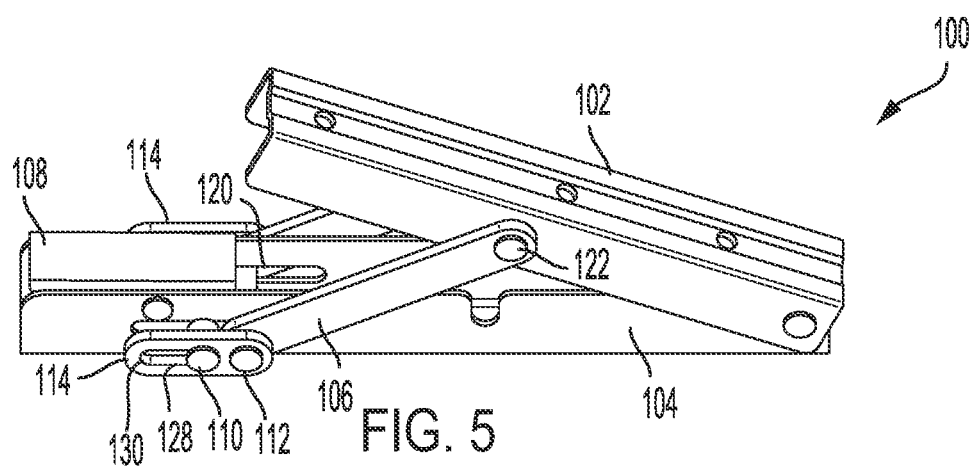
FIG. 5 is a perspective view of the foldable bracket of FIG. 1 while being moved from the opened position to closed position.
Figure 8:
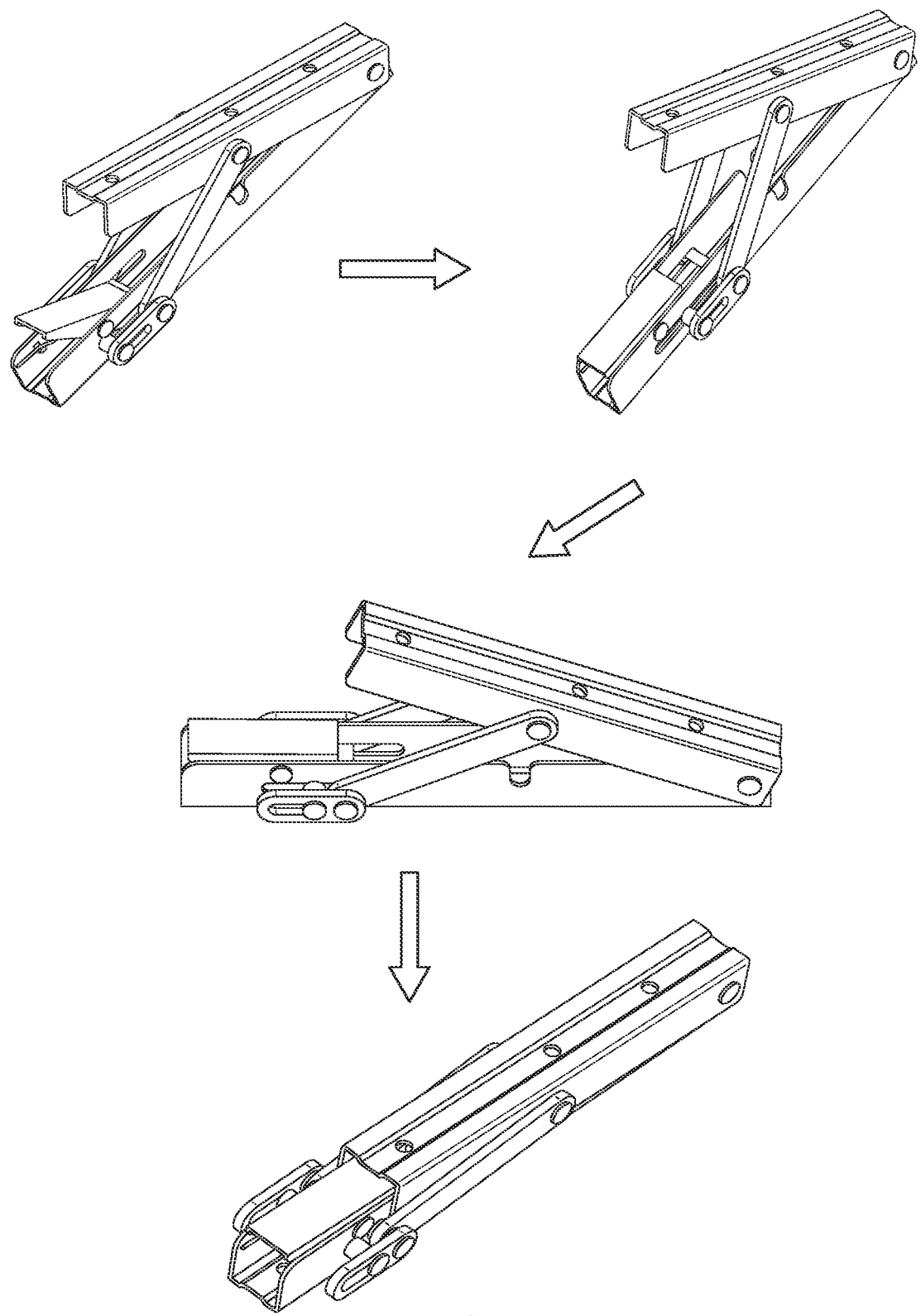
FIG. 8 is a flow diagram showing the steps of moving the foldable bracket of FIG. 1 from an opened position to a folded position, according to an embodiment of the present invention.

Referring to FIG. 8, to move the foldable bracket from the opened position to the folded position, the first 102 and second 104 bracket arms are further rotated away from each other to past the desired angle of the opened position, as illustrated in FIG. 4. As the first 102 and second 104 bracket arms are further rotated away from each other past the desired angle, the first pin 110 slides along second bracket arm slot 120 and engages the releasing lever 108 to overcome the bias force of the biasing member 124 to rotate the release lever 108 from the second position to the first position, as illustrated in FIG. 4. The first 102 and second 104 bracket arms can then be rotated toward each other to allow the foldable bracket 100 to be moved to the folded position. While the first pin 110 retains the release lever 108 in the first position, the second pin 112 slides along the second bracket arm slot 120 and the pin connecting member 114 moves relative to the first pin 110. Once the first pin 110 reaches the second slot end 132 of the pin connecting member slot 128, as illustrated in FIG. 5, the first 110 and second 112 pins are adjacent to each other. As the first 102 and second 104 bracket arms are rotated further toward each other, the first 110 and second 112 pins move together along the second bracket arm slot 120 until the foldable bracket 100 is in the folded position, as illustrated in FIG. 2. In addition, the foldable bracket 100 can be moved to the folded position when a user manually moves the release lever 108 to the first position.

In the embodiment where the foldable bracket 100 is coupled to a seat back 116, for example, the first 102 and second 104 bracket arms are disposed at a desired angle of about 22.5° relative to each other when the foldable bracket 100 in the opened position. However, the invention is not limited as such and the first 102 and second 104 bracket arms can be at any suitable angle relative to each other depending on the application.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A foldable bracket moveable between opened and folded positions, the foldable bracket comprising:
   first and second bracket arms rotatably coupled to each other, wherein the second bracket arm includes a second bracket arm slot;
   a bracket arm linking member rotatably coupled to the first bracket arm and slidably coupled to the second bracket arm;
   first and second pins slidably disposed in the second bracket arm slot, wherein the second pin slidably couples the bracket arm linking member to the second bracket arm;
   a pin connecting member having an aperture and a pin connecting member slot, wherein the second pin is disposed in the aperture and the first pin is slidably disposed in the pin connecting member slot; and
   a release lever rotatably coupled to the second bracket arm and adapted to rotate between first and second positions,
   wherein when the release lever is disposed in the second position and the first and second bracket arms are rotated to a desired angle, the release lever and the second pin are adapted to cooperatively retain the foldable bracket in the opened position, and when the release lever is disposed in the first position, the foldable bracket is adapted to be moved to the folded position.

2. The foldable bracket of claim 1, further comprising a biasing member adapted to apply a biasing force to the release lever to bias the release lever to the second position.

3. The foldable bracket of claim 2, wherein when the first and second bracket arms are rotated relative to each other past the desired angle, the first pin engages the release lever to overcome the bias force and rotate the release lever to the first position to allow the foldable bracket to be moveable to the folded position.

4. The foldable bracket of claim 1, wherein the bracket arm linking member is rotatably coupled to the first bracket arm via a rivet.

5. The foldable bracket of claim 1, wherein the bracket arm linking member is rotatably coupled to the first bracket arm via a threaded fastener.

6. The foldable bracket of claim 1, wherein the desired angle is about 22.5°.

7. The foldable bracket of claim 1, wherein the first bracket arm is adapted to be coupled to a seat back and the second bracket arm is adapted to be coupled to a wall.

8. The foldable bracket of claim 1, wherein the bracket arm linking member includes two bracket arm linking members.

9. The foldable bracket of claim 1, wherein the pin connecting member includes two pin connecting members.

10. A foldable bracket moveable between opened and folded positions, the foldable bracket comprising:
    first and second bracket arms rotatably coupled to each other, wherein the second bracket arm includes a second bracket arm slot;
    bracket arm linking members rotatably coupled to the first bracket arm and slidably coupled to the second bracket arm;
    first and second pins slidably disposed in the second bracket arm slot, wherein the second pin slidably couples the bracket arm linking members to the second bracket arm;
    pin connecting members, each having an aperture and a pin connecting member slot, wherein the second pin is disposed in the apertures of the pin connecting members and the first pin is slidably disposed in the pin connecting member slots of the pin connecting members;
    a release lever rotatably coupled to the second bracket arm and adapted to rotate between first and second positions, wherein when the release lever is disposed in the second position and the first and second bracket arms are rotated to a desired angle, the release lever and the second pin are adapted to cooperatively retain the foldable bracket in the opened position, and when the first and second bracket arms are rotated past the desired angle, the release lever is disposed in the first position to allow the foldable bracket to be movable to the folded position; and
    a biasing member adapted to apply a biasing force to the release lever to bias the release lever to the second position,
    wherein when the foldable bracket is movable to the folded position, the first pin engages the release lever to overcome the bias force and rotate the release lever to the first position.

11. The foldable bracket of claim 10, wherein the bracket arm linking members are rotatably coupled to the first bracket arm via a rivet.

12. The foldable bracket of claim 10, wherein the bracket arm linking members are rotatably coupled to the first bracket arm via a threaded fastener.

13. The foldable bracket of claim 12, wherein the threaded fastener includes a nut and a bolt.

14. The foldable bracket of claim 10, wherein the desired angle is about 22.5°.

15. The foldable bracket of claim 10, wherein the first bracket arm is adapted to be coupled to a seat back and the second bracket arm is adapted to be coupled to a wall.

* * * * *